(12) United States Patent
Yamanaka et al.

(10) Patent No.: US 6,490,185 B1
(45) Date of Patent: Dec. 3, 2002

(54) METHOD FOR CONTROLLING NEUTRAL POINT POTENTIAL OF INVERTER OF NEUTRAL POINT CLAMPING TYPE

(75) Inventors: Katsutoshi Yamanaka, Fukuoka (JP); Akira Kumagai, Fukuoka (JP); Kenji Yamada, Fukuoka (JP)

(73) Assignee: Kabushiki Kaisha Yaskawa Denki, Fukuoka (JP)

( * ) Notice: Subject to any disclaimer, the term of this patent is extended or adjusted under 35 U.S.C. 154(b) by 0 days.

(21) Appl. No.: 10/048,343
(22) PCT Filed: Aug. 9, 2000
(86) PCT No.: PCT/JP00/05347
§ 371 (c)(1), (2), (4) Date: Feb. 27, 2002
(87) PCT Pub. No.: WO01/13504
PCT Pub. Date: Feb. 22, 2001

(30) Foreign Application Priority Data

Aug. 12, 1999 (JP) ............................................. 11-228893
Aug. 19, 1999 (JP) ............................................. 11-233287

(51) Int. Cl.$^7$ ............................................. H02M 7/5387
(52) U.S. Cl. ............................................. 363/98; 363/132
(58) Field of Search ........................... 363/67, 132, 98, 363/17, 41, 43

(56) References Cited

U.S. PATENT DOCUMENTS

| 4,613,807 A | * | 9/1986 | Hosemann ................... 318/807 |
| 5,910,892 A | * | 6/1999 | Lyons et al. ................. 363/132 |
| 6,058,031 A | * | 5/2000 | Lyons et al. ................. 363/132 |

\* cited by examiner

*Primary Examiner*—Shawn Riley
(74) *Attorney, Agent, or Firm*—Jordan and Hamburg LLP

(57) ABSTRACT

A method for controlling a neutral point potential of an inverter of neutral point clamping type irrespective of the power factor by measuring or predicting the phase current in a simple way. An output state taken by an inverter of three-phase neutral point clamping type is represented by a vector. Depending on the phase state where the voltage vector outputted from the inverter is contained between which vectors, the occurrence time ratio of a specific vector corresponding to the voltage vector is changed to stabilize the neutral point voltage. The time of the three-phase output voltage, when six switched states wherein the positive bus, the negative bus, and the neutral line are connected to respective three-phase output terminals are set up, is controlled below a first preset value.

8 Claims, 11 Drawing Sheets

PON

OPN

NPO

NOP

ONP

PNO

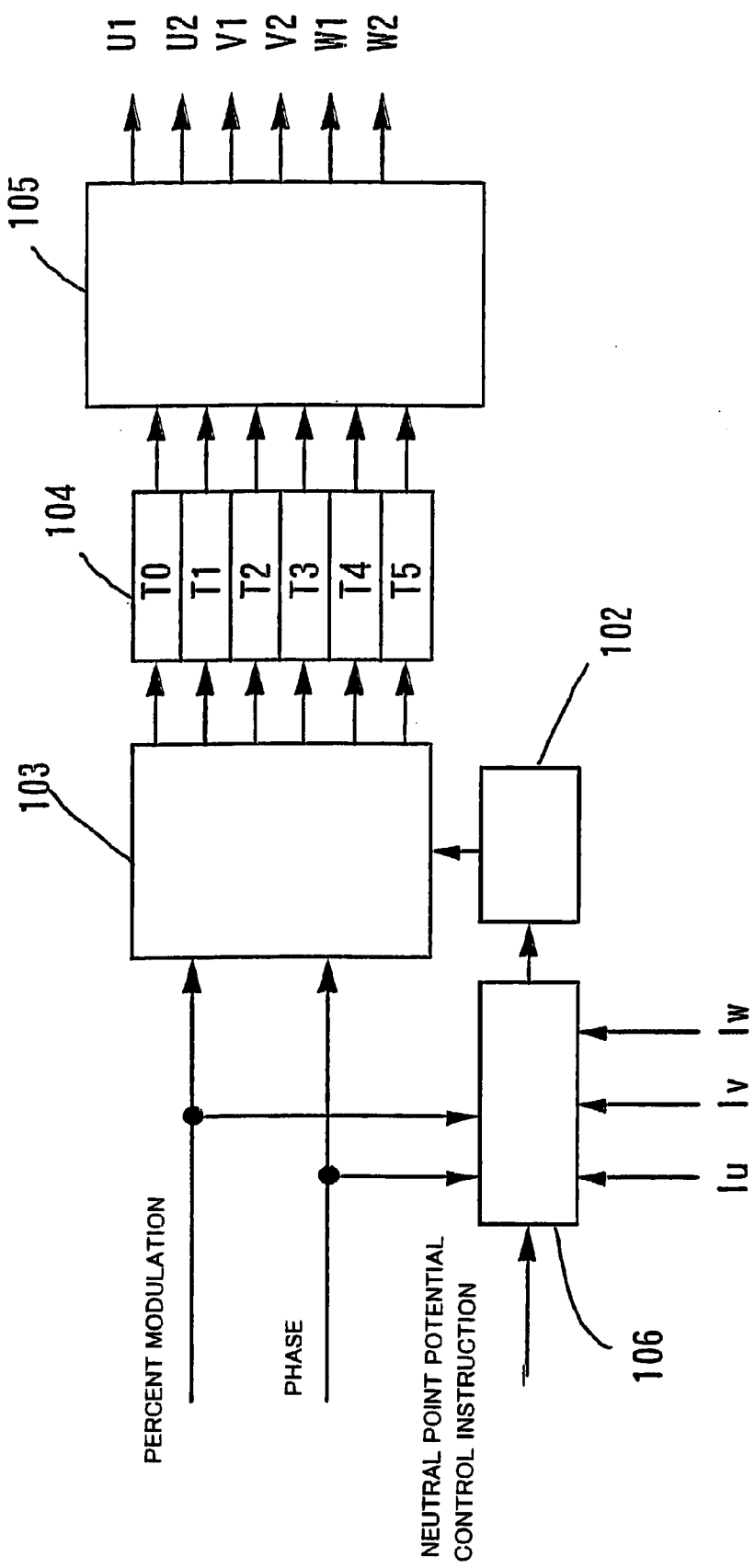

METHOD FOR CONTROLLING NEUTRAL POINT POTENTIAL OF INVERTER OF NEUTRAL POINT CLAMPING TYPE

TECHNICAL FIELD

The present invention relates to a neutral point potential control method of a power conversion device, such as a three-phase neutral point clamp type inverter, for performing variable speed driving of a motor or system interconnection, and a power conversion device, such as an inverter servo drive, for performing variable speed driving of a motor, or a power conversion device for performing system interconnection.

BACKGROUND OF THE INVENTION

Conventionally, as a neutral point potential control method of a three-phase neutral point clamp type inverter, there generally exists a method for carrying out control by applying a zero-phase voltage to an instruction voltage as disclosed in Japanese Patent No. 2821168 "Inverter device and AC motor driving system", and a system in which a neutral point potential is controlled by adjusting a time of an output vector using a space voltage vector system.

FIG. 1 shows a basic structure of a three-phase neutral point clamp type inverter, and in the drawing, reference numeral 1 designates a three-phase AC power source; 2, a rectifying element; 3, 4, smoothing capacitors; 6 to 23, diodes; 24 to 35, IGBTs; and 36, a motor.

In FIG. 1, when a potential difference between a neutral point voltage (voltage of a connection point O of serial-connected smoothing capacitors of the inverter) and a negative bus voltage is Vcn, in the neutral point potential control, Vcn must be controlled to be a half voltage of a bus voltage Vpn of the inverter.

In a case where the three-phase neutral point clamp type inverter as shown in FIG. 1 selects an output vector shown in FIG. 2 and controls Vcn, as voltage vectors which can be used for control of Vcn, there are only twelve vector of xp(1), xn(1), xp(2), xn(2), xp(3), xn(3), yp(1), yn(1), yp(2), yn(2), yp(3), and yn(3). FIG. 3 shows connection states of a load and the smoothing capacitors of the inverter in the case where the twelve vectors are outputted.

When a load current flows in a direction of an arrow shown in FIG. 3, for example, in the connection state of xp(1) and xn(1) of a region 1, since directions of currents flowing to the neutral point become opposite to each other, if xp(1) and xn(1) are generated in such a minute time that a U-phase current does not change as shown in FIG. 4, Vcn rises at the time of the generation of xp(1), and drops at the time of the generation of xn(1), and if a generation time Tp of xp(1) is equal to a generation time Tn of xn(1), an average Vcn in a total generation time Tout (=Tp+Tn) of xp(1) and xn(1) becomes a constant voltage, and if Tp>Tn, then the average Vcn rises. If Tp<Tn, the average Vcn drops.

It is understood that in this way, by adjusting the generation time ratio of the vectors arranged side by side in FIG. 3 (xp(1) and xn(1), yp(1) and yn(1), xp(2) and xn(2), yp(2) and yn(2), xp(3) and xn(3), yp(3) and yn(3)), Vcn can be controlled.

In the neutral point potential control in which the zero-phase voltage is applied to the instruction voltage, application of a positive zero-phase voltage is almost equivalent to lengthening of a generation time ratio of xp(1), xp(2), xp(3), yp(1), yp(2), or yp(3), and application of a negative zero-phase voltage is almost equivalent to lengthening of a generation time of xn(1), xn(2), xn(3), yn(1), yn(2), or yn(3).

In the system in which the space voltage vector is used, for example, when a certain voltage vector in a region i (i=1, 2, ..., 6) is outputted, a total output time of xp(j) and xn(j) vectors is made Tx(i), a total output time of yp(k) and yn(k) vectors is made Ty(i), an output time of xp(j) is made Txp(j), an output time of xn(j) is made Txn(j), an output time of yp(k) is made Typ(k), and an output time of yn(k) is made Tyn(k), and when α is defined to set such a relation as $Txp(j)=\alpha Tx(i)$ $Txn(j)=(1-\alpha)Tx(i)$ $Typ(k)=\alpha Ty(i)$ $Tyn(k)=(1-\alpha)Ty(i)$ (j=1 when i=1,j=2 when k=1 and i=2,j=2 when k=1 and i=3, j=3 when k=2 and i=4,j=3 when k=2 and i=5,j=1 when k=3 and i=6,k=3), in an electrical driving state, when α is made large, Vcn rises, when α is made small, Vcn drops, besides, in a regenerative state, when α is made large, Vcn drops, when α is made small, Vcn rises, whereby, the neutral point potential can be controlled by adjusting α.

However, in the conventional neutral point potential control method in which the zero-phase voltage is added to the instruction, since the neutral point potential control becomes impossible at a load power factor of approximately zero, as a method of performing the neutral point potential control without receiving the influence of the load power factor to solve this, there is a method as disclosed in Japanese Patent Unexamined Publication No. Hei. 9-182455 in which an even component of modulation instructions is superimposed as the zero-phase voltage, however, there has been a problem that an effect is not remarkable although the control is complicated.

Besides, as disclosed in Japanese Patent No. 2888104, although there is a method in which a corresponding neutral point potential period is adjusted according to a direction of a current of a predetermined phase, there has been a problem that in a multi-phase inverter, the control of inter-phase output voltage can not be carried out well.

Then, a first problem to be solved by the present invention is to provide a neutral point potential control method of a three-phase neutral point clamp type inverter in which without degrading the quality of an inter-phase output voltage, neutral point potential control can be carried out irrespective of a power factor by simple measurement or prediction of a phase current, and neutral point potential fluctuation due to load current unbalance at the time of load ground fault can also be suppressed, whereby the quality, stability and safety of the inverter can be improved.

Further, as a conventional PWM pulse generating method of a three-phase neutral point clamp type PWM inverter, as disclosed in Japanese Patent Unexamined Publication No. Hei. 5-146160, there is a unipolar modulation/dipolar modulation for outputting a pulse by comparing an amplitude instruction with a carrier wave, or as disclosed in Japanese Patent Unexamined Publication No. Hei. 5-292754, there is a system in which a generation time of each vector is calculated by using an idea of a space vector and a PWM pulse is generated. FIG. 5 is a vector diagram in which output voltage vectors of a three-phase neutral point clamp type inverter are shown on a plane. When a switch state in which a phase output terminal of the three-phase neutral point clamp type PWM inverter is connected to a positive bus is P, a switch state in which it is connected to a negative bus is N, and a switch state in which it is connected to a neutral line is O, and when they are arranged in the order of UVW of output phases, output voltage vectors which the three-phase neutral point clamp type inverter can take have 27 kinds of switch states as shown in FIG. 5.

Here, for convenience of explanation, the 27 kinds of switch states shown in FIG. 5, which the three-phase neutral point clamp type PWM inverter can take, are classified into groups of zero vector
PPP: Op
OOO: Oo
NNN: On
x vector
POO, OPO, OOP: xp
ONN, NON, NNO: xn
y vector
PPO, OPP, POP: yp
OON, NOO, ONO: yn
z vector
PON, OPN, NPO, NOP, ONP: z
a vector
PNN, NPN, NNP: a
b vector
PPN, NPP, PNP: b and division is made such that regions surrounded by the zero vector, the x vector and the y vector are 1-1 to 6-1, regions surrounded by the x vector, the a vector and the z vector are 1-2 to 6-2, regions surrounded by the x vector, the y vector and the z vector are 1-3 to 6-3, and regions surrounded by the y vector, the b vector and the z vector are 1-4 to 6-4.

In order that the three-phase neutral point clamp type PWM inverter outputs a certain voltage vector A in the regions shown in FIG. 5, vectors in a switch state nearest to the tip of the voltage vector are used, these vectors are successively generated, and a pulse width modulation (PWM) is performed so that a composite value of the vectors in a unit time becomes equal to the voltage vector A and the output voltage is obtained.

In the three-phase neutral point clamp type PWM inverter, generally, as shown in FIG. 6, in order to form a neutral point voltage, an even number of smoothing capacitors 3 and 4 are connected in series between a main circuit positive bus P and a negative bus N, and a neutral line is taken from a terminal 0 of a capacitor which has exactly a middle voltage between the positive bus P and the negative bus N and is used. In FIG. 6, reference numeral 1 designates a three-phase AC power source; 2, a rectifying diode bridge; 6 to 11, clamp diodes; 12 to 23, reflux diodes; 24 to 35, IGBTs; 36 to 38, current sensors; and 39, a load motor.

The neutral line 0 is connected as shown in FIGS. 7 and 8 according to the PWM inverter output load (the load motor 39) and a switch state of the PWM inverter. The potential of the neutral line (neutral point potential) is changed by a current for charging the capacitor from the positive bus/negative bus and a current from the connected load.

In the switch states shown in FIG. 7, a set of switch states in which although line-to-line voltages outputted to the load are the same, load phases connected to the neutral line are different (adjacent switch states in FIG. 7 are made a set), is used, and a time ratio of generation of the switch states of this set is adjusted, so that the neutral point potential can be finely controlled.

However, in the switch state shown in FIG. 8, the neutral point potential is changed by the phase current of the load connected to the neutral line and the time ratio of generation of this switch state, and there is no switch state to completely correct this, so that the neutral point potential fluctuation caused by the switch state of FIG. 8 must be corrected by using the switch state of FIG. 7.

Then, conventionally, as disclosed in Japanese Patent Unexamined Publication No. Hei. 2-261063, a zero-phase voltage is added to a percent modulation, and generation times of the switch states of the set shown in FIG. 7 are adjusted, so that the neutral point potential fluctuation is controlled without changing the line-to-line output voltage supplied to the load. Besides, also in a space vector method, a voltage vector to be outputted is outputted so as to use the set of the switch states shown in FIG. 7, and the generation times of the switch states of the set are adjusted so that the neutral point potential is controlled.

In the three-phase neutral point clamp type inverter, the neutral point potential fluctuation at the time of the switch state of FIG. 8 is determined by the phase current of the load connected to the neutral line from FIG. 8. When the phase current (when load power factor=1) of the load connected to the neutral line is depicted in FIG. 9, since the direction of a phase current 110 of the load connected to the neutral line is always inverted before the output voltage vector is changed by 120 degrees, there has been a problem that the neutral point potential fluctuates at a frequency three times as high as the output frequency by this influence.

Further, in the case where the percent modulation is rather high, the generation time ratio of the switch state shown in FIG. 8 becomes higher than that of the switch state shown in FIG. 7, and in an excessive modulation state in which the percent modulation exceeds about 1.15, there has been a problem that the generation time ratio of the switch state shown in FIG. 7 becomes completely zero, and the fluctuation of the neutral point potential caused by the switch state shown in FIG. 8 can not be suppressed.

Then, a second problem to be solved by the present invention is to suppress the neutral point potential fluctuation of the three-phase neutral point clamp type inverter, to enable adjustment of the neutral point potential at the time of excessive modulation, which has been conventionally impossible, and to realize the improvement of safety and the improvement of output voltage quality.

DISCLOSURE OF THE INVENTION

In order to solve the first problem, a neutral point potential control method of a neutral point clamp type inverter of the present invention is (1) a neutral point potential control method characterized in that when a state in which a phase output terminal of a three-phase neutral point clamp type inverter is connected to a positive bus voltage point of the inverter is P, a state in which it is connected to a neutral point of a bus of the inverter is O, and a state in which it is connected to a negative bus voltage point of the inverter is N, and when an output voltage is expressed as a space vector such that as a three-phase output state of the inverter in order of a U phase, a V phase and a W phase, an output state which becomes POO is a vector xp(1),
an output state which becomes ONN is a vector xn(1),
an output state which becomes PPO is a vector yp(1),
an output state which becomes OON is a vector yn(1),
an output state which becomes OPO is a vector xp(2),
an output state which becomes NON is a vector xn(2),
an output state which becomes OPP is a vector yp(2),
an output state which becomes NOO is a vector yn(2),
an output state which becomes OOP is a vector xp(3),
an output state which becomes NNO is a vector xn(3),
an output state which becomes POP is a vector yp(3), and
an output state which becomes ONO is a vector yn(3),
in the three-phase neutral point clamp type inverter,
in a case where an angle of a voltage vector to be outputted by the inverter is contained by the vector yp(3) and the vector yp(1), a generation time ratio of the vector xp(1) to the vector xn(1) is changed according to a direction of a current of the U phase,
in a case where the angle of the voltage vector to be outputted by the inverter is contained by the vector yp(1) and the vector yp(2), a generation time ratio of the vector xp(2) to the vector xn(2) is changed according to a direction of a current of the V phase,
in a case where the angle of the voltage vector to be outputted by the inverter is contained by the vector yp(2) and the vector yp(3), a generation time ratio of the vector xp(3) to the vector xn(3) is changed according to a direction of a current of the W phase,
in a case where the angle of the voltage vector to be outputted by the inverter is contained by the vector xp(1) and the vector xp(2), a generation time ratio of the vector yp(1) to the vector yn(1) is changed according to the direction of the current of the W phase,
in a case where the angle of the voltage vector to be outputted by the inverter is contained by the vector xp(2) and the vector xp(3), a generation time ratio of the vector yp(2) to the vector yn(2) is changed according to the direction of the current of the U phase, and
in a case where the angle of the voltage vector to be outputted by the inverter is contained by the vector xp(3) and the vector xp(1), a generation time ratio of the vector yp(3) to the vector yn(3) is changed according to the direction of the current of the V phase,
whereby a neutral point voltage of the three-phase neutral point clamp type inverter is stabilized.

(2) A neutral point potential control method is characterized in that when a state in which a phase output terminal of a three-phase neutral point clamp type inverter is connected to a positive bus voltage point of the inverter is P, a state in which it is connected to a neutral point of a bus of the inverter is O, and a state in which it is connected to a negative bus voltage point of the inverter is N, and when an output voltage is expressed as a space vector such that as a three-phase output state of the inverter in order of a U phase, a V phase and a W phase, an output state which becomes POO is a vector xp(1),
an output state which becomes ONN is a vector xn(1),
an output state which becomes PPO is a vector yp(1),
an output state which becomes OON is a vector yn(1),
an output state which becomes OPO is a vector xp(2),
an output state which becomes NON is a vector xn(2),
an output state which becomes OPP is a vector yp(2),
an output state which becomes NOO is a vector yn(2),
an output state which becomes OOP is a vector xp(3),
an output state which becomes NNO is a vector xn(3),
an output state which becomes POP is a vector yp(3), and
an output state which becomes ONO is a vector yn(3),
in the three-phase neutral point clamp type inverter,
in a case where an angle of a voltage vector to be outputted by the inverter is contained by the vector yp(3) and the vector yp(1), a generation time ratio of the vector xp(1) to the vector xn(1) is changed according to a direction of a sum of currents of the V phase and the W phase,
in a case where the angle of the voltage vector to be outputted by the inverter is contained by the vector yp(1) and the vector yp(2), a generation time ratio of the vector xp(2) to the vector xn(2) is changed according to a direction of a sum of currents of the U phase and the W phase,
in a case where the angle of the voltage vector to be outputted by the inverter is contained by the vector yp(2) and the vector yp(3), a generation time ratio of the vector xp(3) and the vector xn(3) is changed according to a direction of a sum of currents of the U phase and the V phase,
in a case where the angle of the voltage vector to be outputted by the inverter is contained by the vector xp(1) and the vector xp(2), a generation time ratio of the vector yp(1) to the vector yn(1) is changed according to the direction of the sum of the currents of the U phase and the V phase,
in a case where the angle of the voltage vector to be outputted by the inverter is contained by the vector xp(2) and the vector xp(3), a generation time ratio of the vector yp(2) to the vector yn(2) is changed according to the direction of the sum of the currents of the V phase and the W phase, and
in a case where the angle of the voltage vector to be outputted by the inverter is contained by the vector xp(3) and the vector xp(1), a generation time ratio of the vector yp(3) to the vector yn(3) is changed according to the direction of the sum of the currents of the U phase and the W phase,
whereby a neutral point voltage of the three-phase neutral point clamp type inverter is stabilized.

(3) A neutral point potential control method is characterized in that when a state in which a phase output terminal of a three-phase neutral point clamp type inverter is connected to a positive bus voltage point of the inverter is P, a state in which it is connected to a neutral point of a bus of the inverter is O, and a state in which it is connected to a negative bus voltage point of the inverter is N, and when an output voltage is expressed as a space vector such that as a three-phase output state of the inverter in order of a U phase, a V phase and a W phase, an output state which becomes POO is a vector xp(1),
an output state which becomes ONN is a vector xn(1),
an output state which becomes PPO is a vector yp(1),
an output state which becomes OON is a vector yp(1),
an output state which becomes OPO is a vector xp(2), an output state which becomes NON is a vector xn(2),
an output state which becomes OPP is a vector yp(2),
an output state which becomes NOO is a vector yp(2),
an output state which becomes OOP is a vector xp(3),
an output state which becomes NNO is a vector xn(3),
an output state which becomes POP is a vector yp(3), and
an output state which becomes ONO is a vector yn(3),
in the three-phase neutral point clamp type inverter, in a case where an angle of a voltage vector to be outputted by the inverter is contained by the vector yp(3) and the vector yp(1), a current Iu of the U phase is compared with a sum of a current Iv of the V phase and a current Iw of the W phase, and if Iu and Iv+Iw have a same sign and if |Iu |<|Iv+Iw |, then generation of the vector xp(1) is suppressed, if |Iu |>|Iv+Iw |, then generation of the vector xn(1) is suppressed, in a case where the angle of the voltage vector to be outputted by the inverter is contained by the vector yp(1) and the vector yp(2), the current Iv of the V phase is compared with a sum of the current Iu of the U phase and the current Iw of the W phase, and if Iv and Iu+Iw have a same sign and if |Iv|<|Iu+Iw|, then generation of the vector xp(2) is suppressed, if |Iv|>|Iu+Iw|, then generation of the vector xn(2) is suppressed, in a case where the angle of the voltage vector to be outputted by the inverter is contained by the vector yp(2) and the vector yp(3), the current Iw of the W phase is compared with a sum of the current Iu of the U phase and the current Iv of the V phase, and if Iw and Iu+Iv have a same sign and if |Iw|<|Iu+Iv|, then generation of the vector xp(3) is suppressed, if |Iw|>|Iu+Iv|, then generation of the vector xn(3) is suppressed, in a case where the angle of the voltage vector to be outputted by the inverter is contained by the vector xp(1) and the vector xp(2), the current Iw of the W phase is compared with the sum of the current Iu of the U phase and the current Iv of the V phase, and if Iw and Iu+Iv have a same sign and if |Iw|<|Iu+Iv|, then generation of the vector yn(1) is suppressed, if |Iw|>|Iu+Iv|, then generation of the vector yp(1) is suppressed, in a case where the angle of the voltage vector to be outputted by the inverter is contained by the vector xp(2) and the vector xp(3), the current Iu of the U phase is compared with the sum of the current Iv of the V phase and the current Iw of the W phase, and if Iu and Iv+Iw have a same sign and if |Iu|<|Iv+Iw|, then generation of the vector yn(2) is suppressed, if |Iu|>|Iv+Iw|, then generation of the vector yp(2) is suppressed, and in a case where the angle of the voltage vector to be outputted by the inverter is contained by the vector xp(3) and the vector xp(1), the current Iv of the V phase is compared with the sum of the current Iu of the U phase and the current Iw of the W phase, and if Iv and Iu+Iw have a same sign and if |Iv|<|Iu+Iw|, then generation of the vector yn(3) is suppressed, if |Iv|>|Iu+Iw|, then generation of the vector yp(3) is suppressed, whereby a neutral point voltage of the three-phase neutral point clamp type inverter is stabilized.

According to the neutral point potential control method of the three-phase neutral point clamp type inverter as described in (1) and (2), the neutral point potential control becomes possible irrespective of the load power factor, and the control becomes simple since the direction of the load current is merely detected. Besides, according to the neutral point potential control of the three-phase neutral point clamp type inverter as described in (3), it is possible to suppress an abrupt neutral point potential fluctuation in a case where the inverter output is grounded, and the stability is improved.

Besides in order to solve the second problem, a three-phase neutral point clamp type PWM inverter device is (1) a three-phase neutral point clamp type PWM inverter device including neutral point clamp type PWM inverters for three phases, each of which includes a positive bus, a negative bus, and a neutral line, and in each of which a first and a second switch elements and a third and a fourth switch elements are connected in series between the positive bus and a phase voltage output terminal and between the negative bus and the phase output terminal, respectively, and a connection point of the first and the second switch elements and a connection point of the third and the fourth switch elements are connected to the neutral line through clump elements, respectively, and characterized in that a time of a three-phase output voltage of six switch states in which the positive bus, the negative bus, and the neutral line are respectively connected to the three-phase phase output terminals is suppressed to be a first set value or less, and an insufficiency of the output voltage resulting from suppression to the first set value or less is compensated by six switch states among eight switch states in which the three-phase phase output terminals are respectively connected to the positive bus or the negative bus except two switch states in which all of the three-phase phase output terminals are connected to the positive bus or the negative bus at the same time.

(2) In the three-phase neutral point clamp type PWM inverter device of (1), the three-phase neutral point clamp type PWM inverter device is characterized in that when the six switch states in which the suppression to the first set value or less is carried out are transferred to the six switch states for compensating the insufficiency of the output voltage, the switch state of only one phase of the neutral point clamp type PWM inverter is changed.

(3) In the three-phase neutral point clamp type PWM inverter device of (1) or (2), the three-phase neutral point clamp type PWM inverter device is characterized in that the first set value is changed according to a value of a percent modulation index.

(4) In the three-phase neutral point clamp type PWM inverter device of (1) or (2), the three-phase neutral point clamp type PWM inverter device is characterized in that the first set value is changed according to a direction of a current flowing to the neutral line or a phase of an output current.

(5) In the three-phase neutral point clamp type PWM inverter device of (1) or (2), the three-phase neutral point clamp type PWM inverter device is characterized in that the first set value is changed according to a voltage value of the neutral line.

BRIEF DESCRIPTION OF THE DRAWINGS

FIGS. 17 and 18 are block diagrams showing examples of PWM pulse pattern generating circuits of the present invention.

BEST MODE FOR CARRYING OUT THE INVENTION

Embodiments of a neutral point potential control method of a neutral point clamp type inverter of the present invention will be described with reference to the drawings.

According to a first embodiment of the present invention, first, in addition to the foregoing $\alpha$ used in the conventional neutral point potential control, two parameters of $\alpha 1$ and $\alpha 2$ are prepared, and if a total output time of xp(j) and xn(j) vectors is made Tx(i) when a certain voltage vector in a region i (i=1, 2, . . . , 6) is outputted, a total output time of yp(k) and yn(k) vectors is made Ty(i), an output time of xp(j) is made Txp(j), an output time of xn(j) is made Txn(j), an output time of yp(k) is made Typ(k), and an output time of yn(k) is made Tyn(k), a modification is made such that $Txp(j) = \alpha 1 \cdot Tx(i)$ $Txn(j) = (1-\alpha 1) \cdot Tx(i)$ $Typ(k) = \alpha 2 \cdot Ty(i)$ $Tyn(k) = (1-\alpha 2) \cdot Ty(i)$ (j=1 when i=1, j=2 when k=1 and i=2, j=2 when k=1 and i=3, j=3 when k=2 and i=4, j=3 when k=2 and i=5, j=1 when k=3 and i=6, k=3).

Next, parameters of X1 and X2 are prepared, the correspondence of X1 and X2 to phase currents is set as shown in table 1, and the phase currents Iu, Iv and Iw (a case where a current flows from the inverter to a motor is made positive) of the inverter output are applied to X1 and X2 in accordance with table 1, and $\alpha$ is made to correspond to $\alpha 1$ and $\alpha 2$ in such a manner that if $X1 \geq 0$, then $\alpha 1 = \alpha$.

if $X1 < 0$, then $\alpha 1 = (1-\alpha)$, if $X2 \geq 0$, then $\alpha 2 = (1-\alpha)$ and if $X2 < 0$, then $\alpha 2 = \alpha$.

TABLE 1

| Region | 1 | 2 | 3 | 4 | 5 | 6 |
|---|---|---|---|---|---|---|
| X1= | Iu | Iv | Iv | Iw | Iw | Iu |
| X2= | Iw | Iw | Iu | Iu | Iv | Iv |

(note: in the phase current, the direction of inverter → motor is made positive)

Figure 10:
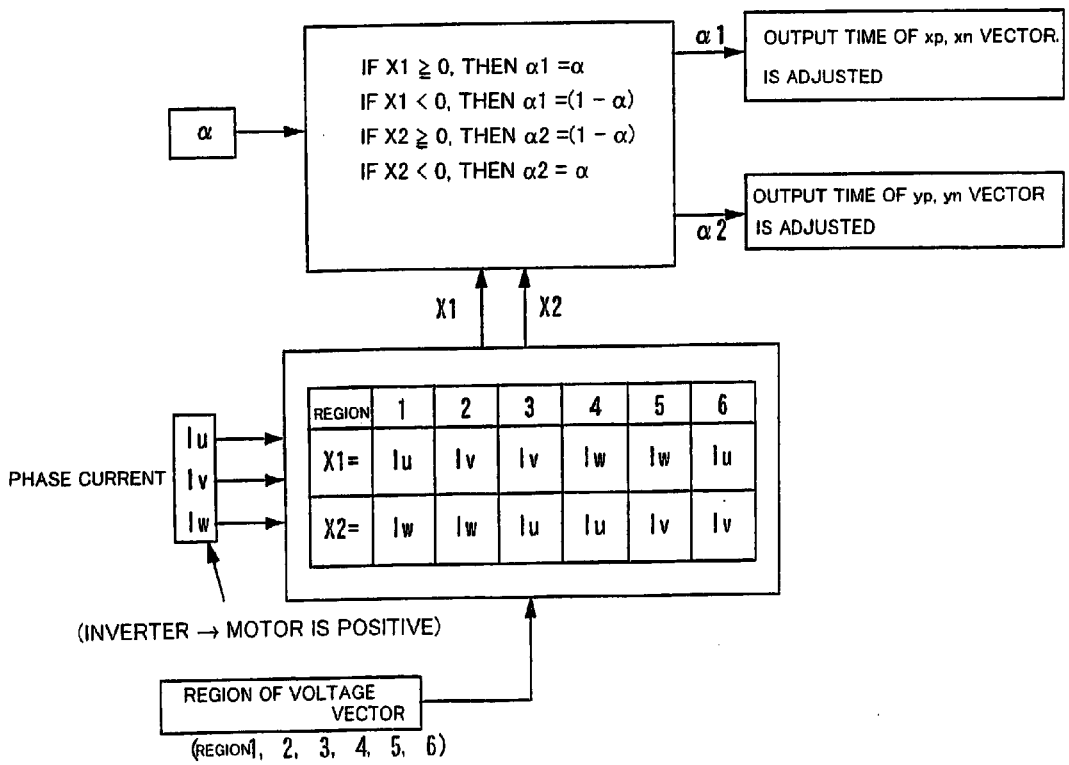
FIG. 10 is an additional control block diagram of embodiment 1 of the present invention.

FIG. 10 shows a control block of the embodiment 1.

By doing so, the direction of a current flowing to the neutral point current can be adjusted according to the judgement of the positive or negative of the phase current, and the neutral point potential can be obtained in which when $\alpha$ is made large irrespective of the load power factor, Vcn rises, and when $\alpha$ is made small, Vcn drops.

According to a second embodiment of the present invention, the embodiment 1 in which the direction of a current of only one phase is measured, is modified such that the direction of the sum of current values of two phases is measured as in table 2.

TABLE 2

| Region | 1 | 2 | 3 | 4 | 5 | 6 |
|---|---|---|---|---|---|---|
| X1= | Iv + Iw | Iu + Iw | Iu + Iw | Iu + Iv | Iu + Iv | Iv + Iw |
| X2= | Iu + Iv | Iu + Iv | Iv + Iw | Iv + Iw | Iu + Iw | Iu + Iw |

(note: in the phase current, the direction of the inverter → the motor is made positive)

Figure 11:
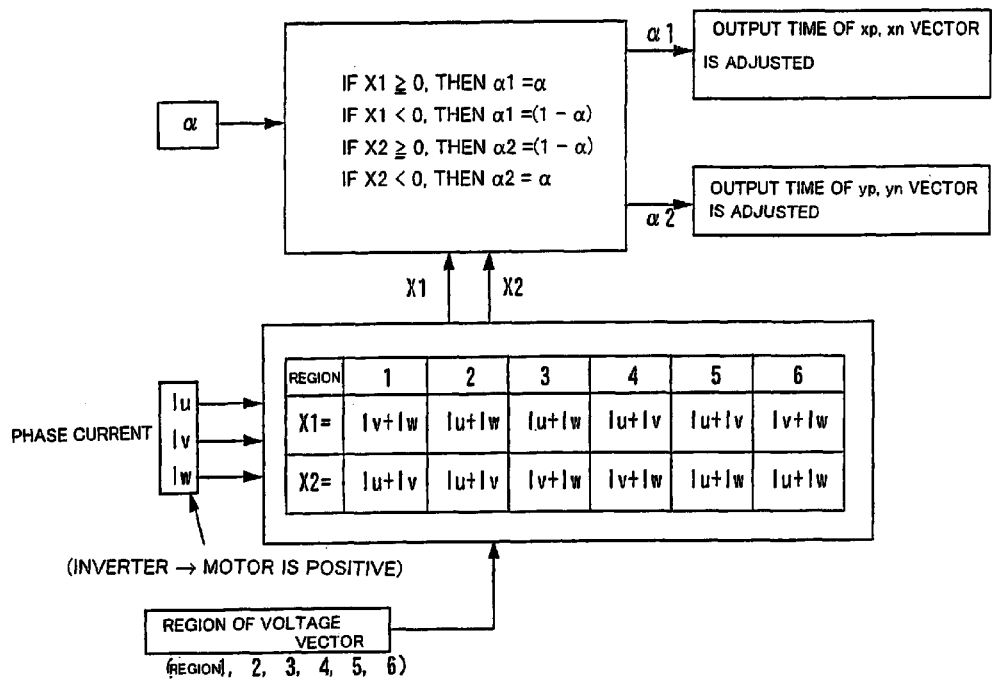
FIG. 11 is an additional control block diagram of embodiment 2 of the present invention.

FIG. 11 shows a control block of the embodiment 2.

Figure 12:
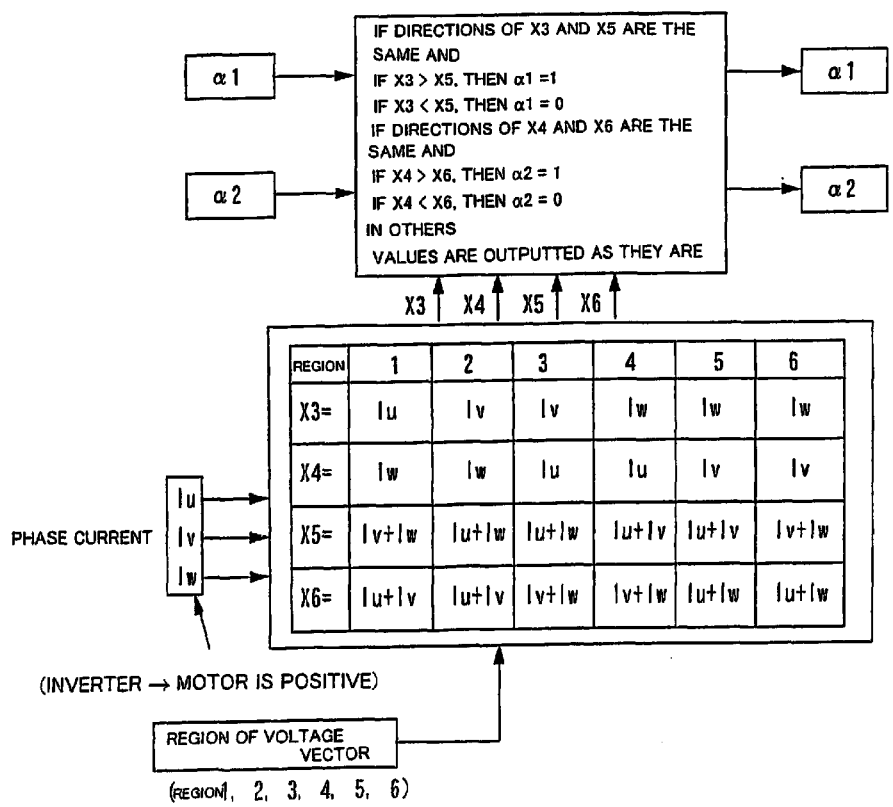
FIG. 12 is an additional control block diagram of embodiment 3 of the present invention.

Concerning a third embodiment of the present invention, in the case of the three-phase output inverter and in the case where the output currents are balanced, as in the embodiment 1 or the embodiment 2, the current direction of one phase or the sum of two phases has only to be measured, however, in the case where the output currents are not balanced by ground fault of a load or the like, there arises such a problem that neutral point potential control becomes impossible. Then, a control block as shown in FIG. 12 is added to the embodiment 1 or the embodiments 2, and at the time of output current unbalance, values of $\alpha 1$ and $\alpha 2$ are adjusted, so that a vector of a smaller current flowing to the neutral point is selected and is generated. By doing so, fluctuation of the neutral point potential at the time of the output current unbalance can be suppressed.

Besides, in the embodiments 1, 2 and 3, although the description has been made such that the direction of the current of each phase is actually measured, with respect to the direction of the current of each phase, a value derived and predicted from an instruction value of a current to be outputted by the inverter, or the like may be used.

As described above, when the neutral point potential control method of the neutral point clamp type inverter of the present invention is used, it becomes possible to carry out the neutral point potential control irrespective of the power factor by the simple method in which the direction of the load current is measured or predicted, and the stability and safety of the inverter is remarkably improved. Besides, the neutral point potential fluctuation due to the load current unbalance at the time of the load ground fault can be suppressed, and the safety is further improved.

Next, an embodiment of a three-phase neutral point clamp type PWM inverter device of the present invention will be described with reference to the drawings.

FIGS. 13 to 16 are examples of PWM output pulse trains of the present invention.

In FIGS. 13 to 16, the illustration is made such that a period of a PWM output is 2×T, the horizontal axis is made a time series, and a pulse is outputted in order from the left to the right.

Figure 13:
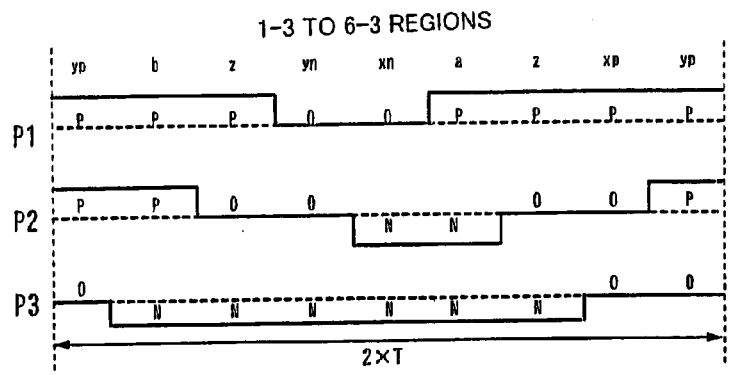
FIGS. 13 to 16 are time charts showing examples of PWM pulse patterns of the present invention.
Figure 14:
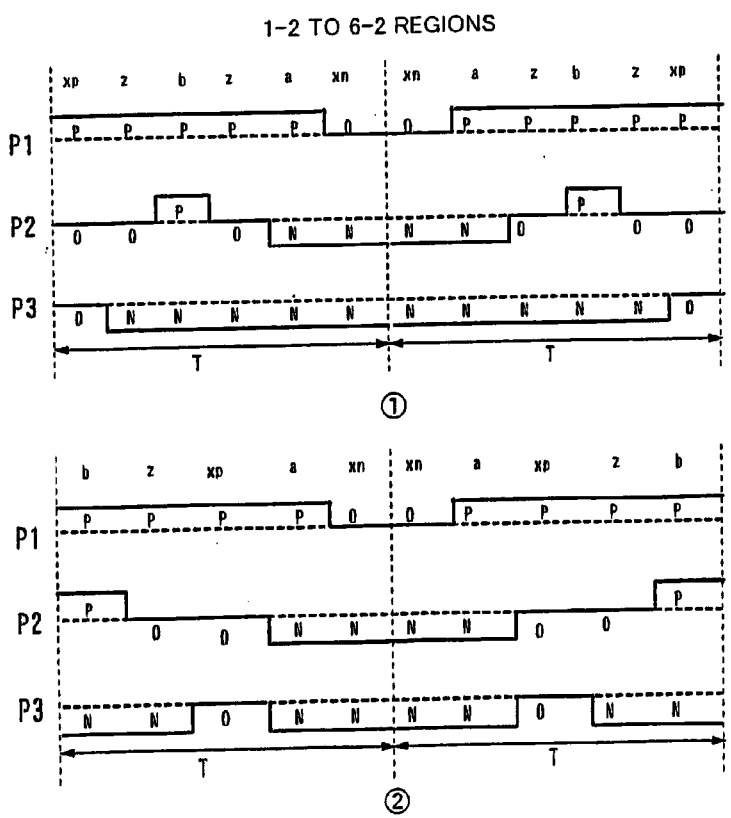
Figure 15:
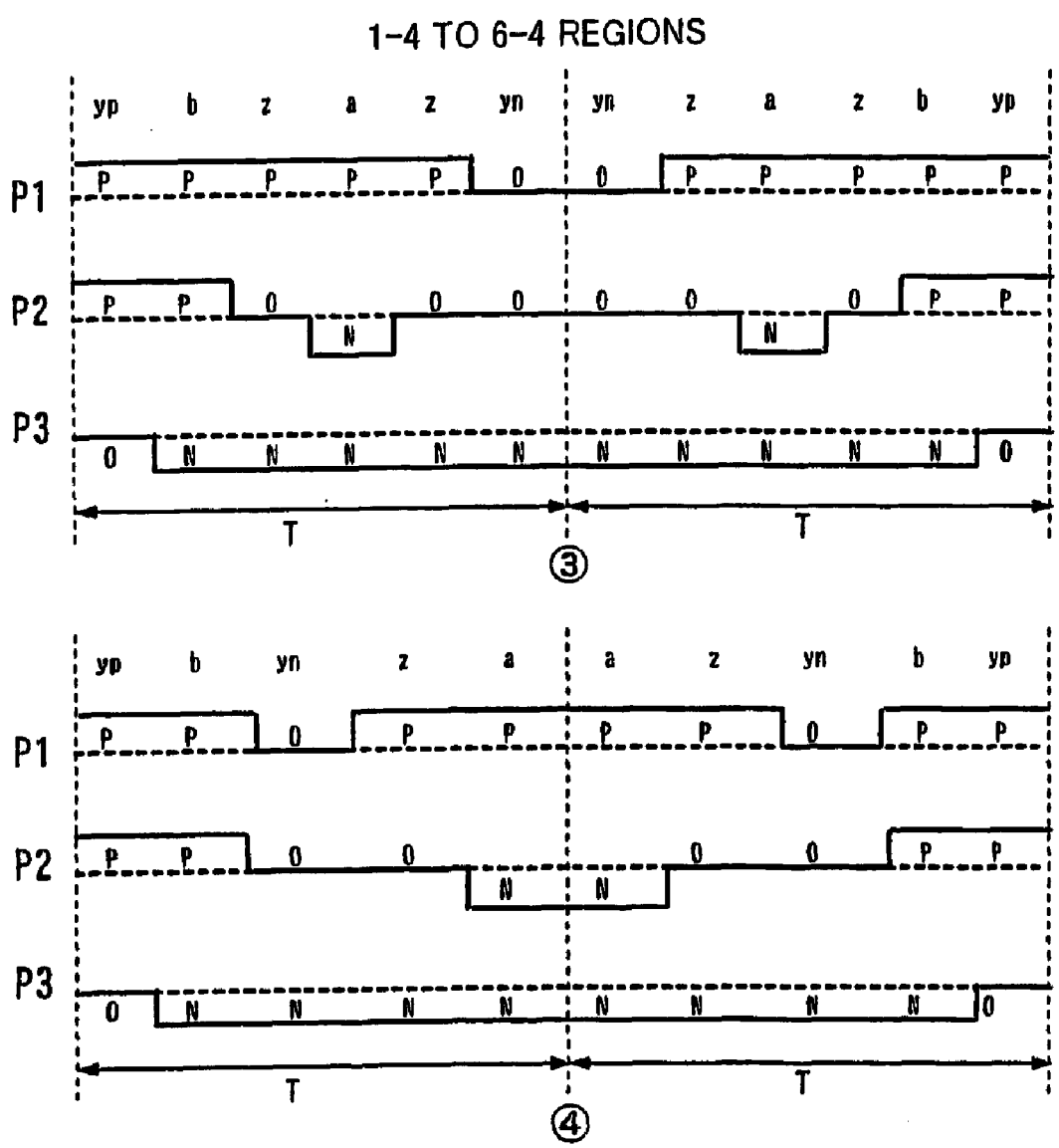

In the examples shown in FIGS. 13 to 15, in the case where the z vector is included in three adjacent vectors of a voltage vector to be outputted, a transfer can be made by the change of the switch state of only one phase from the z vector, and the a or b vector not included in the three adjacent vectors is also outputted.

1-3 to 6-3 regions (FIG. 13)
Example 1: yp→b→z→yn→xn→a→z→xp→yp
1-2 to 6-2 regions (FIG. 14)
Example 2: xp→z→b→z→a→xn, xn→a→z→b→z→xp
Example 3: b→z→xp→a→xn, xn→a→xp→z→b
1-4 to 6-4 regions (FIG. 15)
Example 4: yp→b→z→a→z→yn, yn→z→a→b→yp
Example 5: yp→b→yn→z→a, a→z→yn→b→yp Although not shown in the examples, even in reverse order to the above examples (the PWM pulse is outputted in order from the right to the left), an average value of the output voltage becomes the same as the above example.

Figure 1:
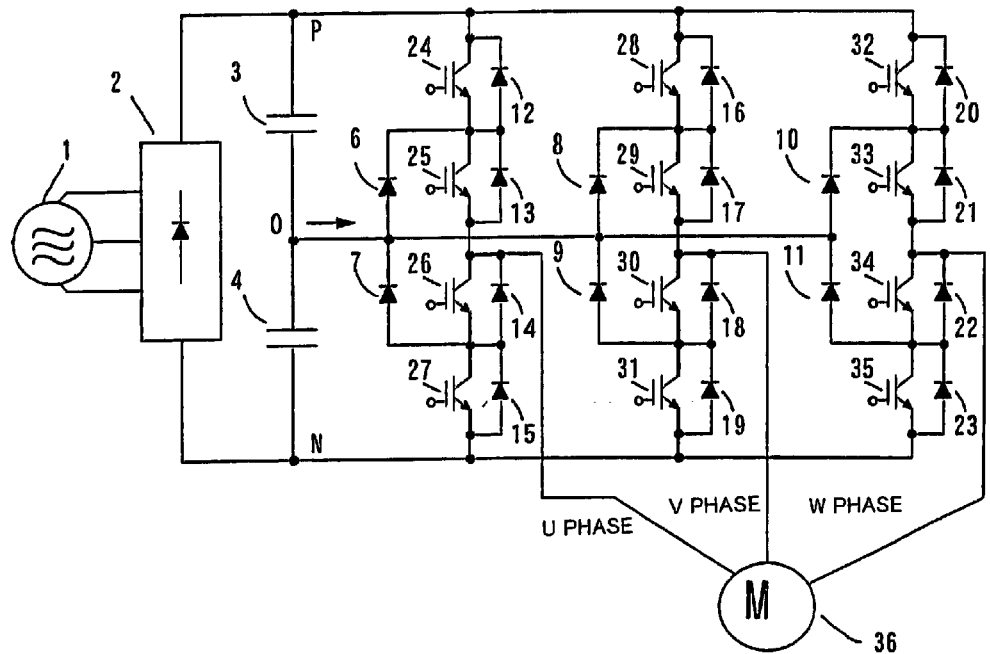
FIG. 1 is a main circuit diagram of a general three-phase neutral point clamp type inverter.
Figure 2:
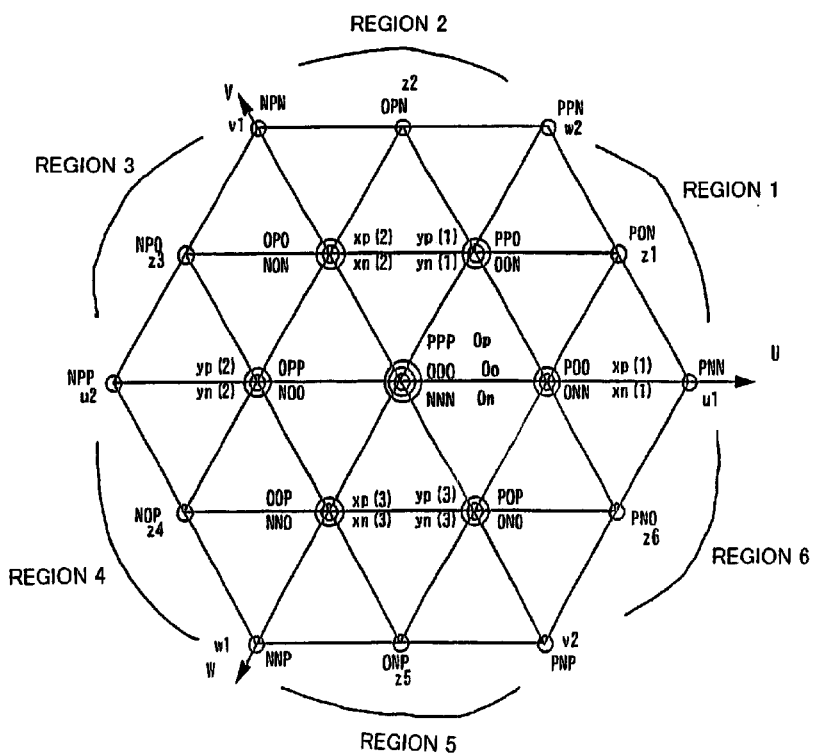
FIG. 2 is a vector diagram showing space voltage vectors of the three-phase neutral point clamp type inverter.
Figure 3:
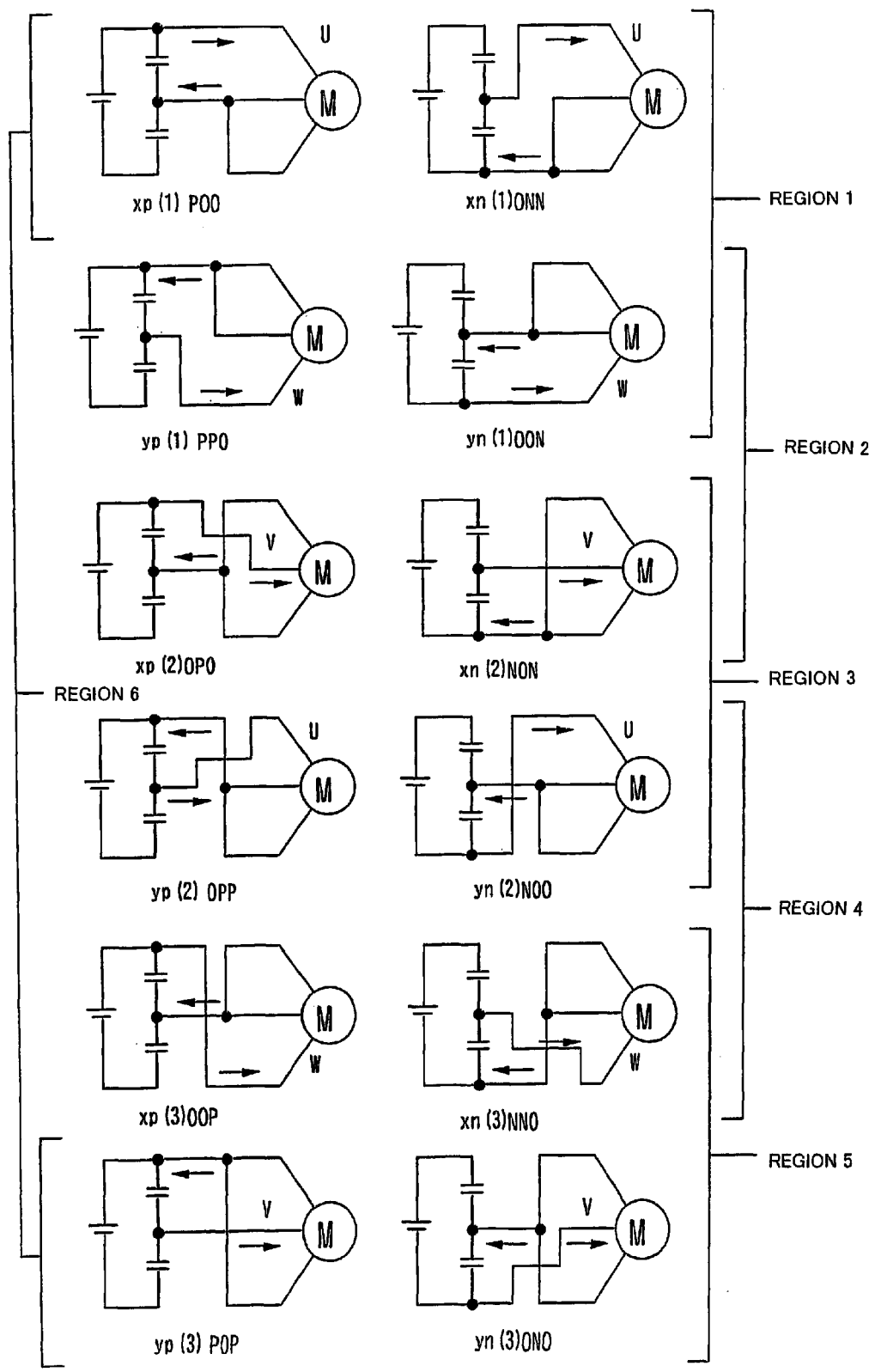
FIG. 3 is a connection state diagram of inverter smoothing capacitors and a load at a time of generation of vectors which can be used for neutral point potential control of the three-phase neutral point clamp type inverter.
Figure 4:
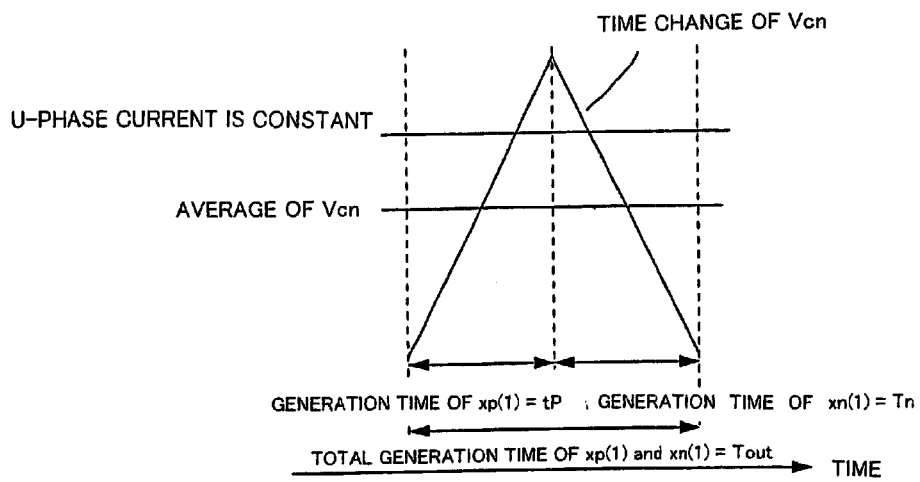
FIG. 4 is a conceptual diagram showing a neutral point potential change in a case where xp(1) and xn(1) vectors are generated.
Figure 5:
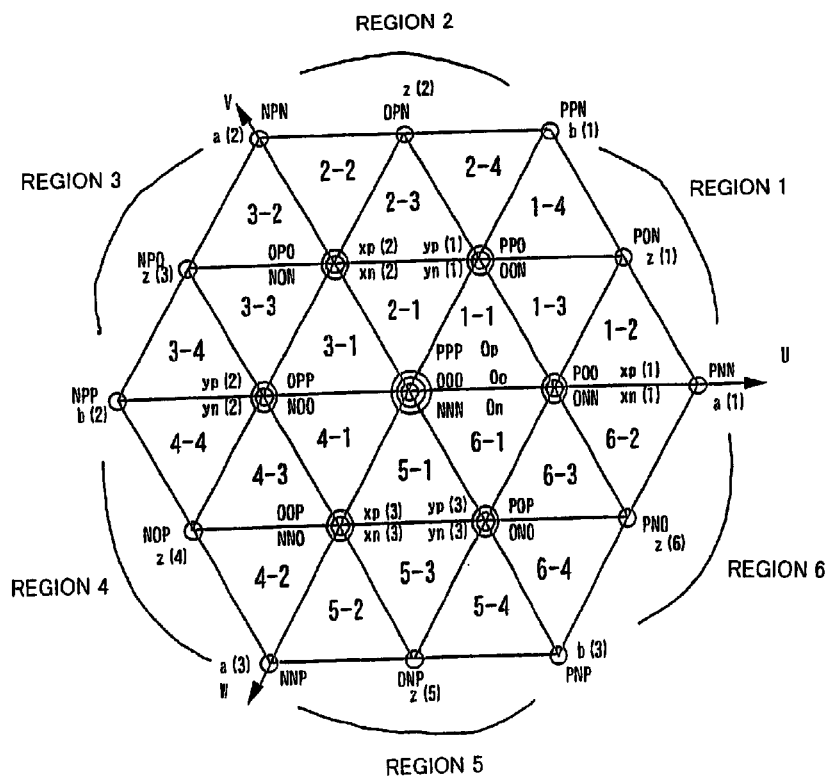
FIG. 5 is an output voltage space vector diagram of the three-phase neutral point clamp type inverter.

When the foregoing pulse trains are outputted, in the case where a percent modulation of a voltage vector to be outputted is made k (a radius of an inscribed circle of a hexagon of FIG. 5 is made 1), an angle from the nearest a vector in terms of an angle is made $\theta$, a period of the PWM output pulse is made T, and an output time of the z vector is made T2, generation times of respective switch states can be expressed as follows:

in the 1-3 to 6-3 regions,
generation time (T0) of the zero vector is T0=0
generation time (T1) of the x vector is T1=T{1−2k sin $\theta$}
generation time (T2) of the z vector is an arbitrary value of not larger than T2=T{2k sin($\theta$+$\pi$/3)−1} and not less than zero,
generation time (T3) of the y vector is T3=T{1−2k sin($\pi$/3−$\theta$)}
generation time (T4) of the a vector is T4=[T{2k sin($\theta$+$\pi$/3)−1}−T2]/2
generation time (T5) of the b vector is T5=[T{2k sin($\theta$'+$\pi$/3)−1}−T2]/2 in the 1-2 to 6-2 regions,
generation time (T0) of the zero vector is T0=0
generation time (T1) of the x vector is T1=T{1−k sin($\theta$+$\pi$/3)}
generation time (T2) of the z vector is an arbitrary value not larger than T2=2Tk sin $\theta$ and not less zero
generation time (T3) of the y vector is T3=0
generation time (T4) of the a vector is T4=T($3^{1/2}$k cos $\theta$−1)−T2/2
generation time (T5) of the b vector is T5=(2Tk sin $\theta$−T2)/2 in the 1-4 to 6-4 regions,
generation time (T0) of the zero vector is T0=0
generation time (T1) of the x vector is T1=0
generation time (T2) of the z vector is an arbitrary value not larger than T2=2Tk sin($\pi$/3−$\pi$) and not less than zero
generation time (T3) of the y vector is T3=2T{1−k sin($\theta$+$\pi$/3)}
generation time (T4) of the a vector is T4={2k sin($\theta$/3−$\theta$)−T2}/2
generation time (T5) of the b vector is T5=T($3^{1/2}$k cos($\pi$/3−$\theta$)−1)−T2/2.

Figure 16:
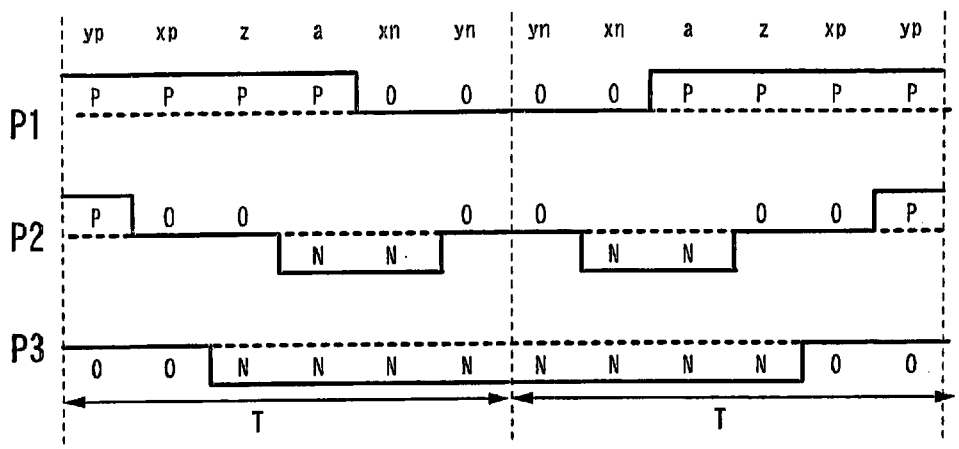
Figure 16:
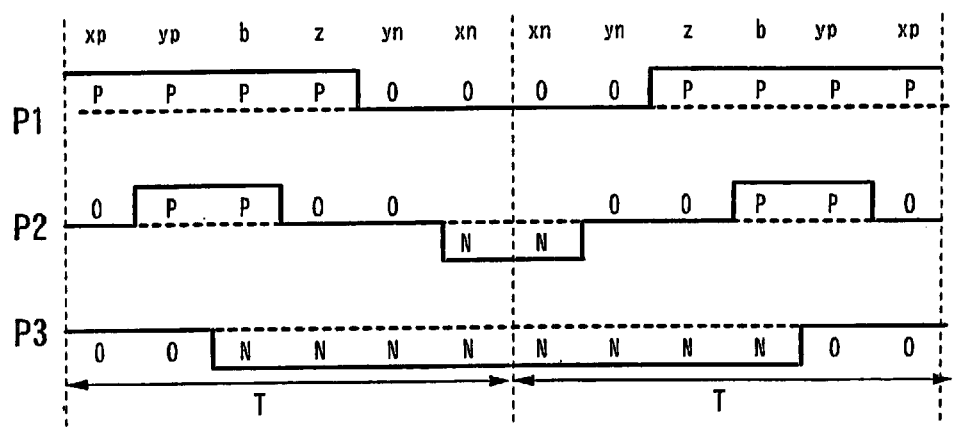

Further, in the 1-3 to 6-3 regions,
example 6: yp→xp→z→a→xn→yn, yn→a→z→xp→yp
example 7: xp→yp→b→z→yn→xn, xn→yn→z→b→yp→xp patterns as shown in FIG. 16 can also be taken, and generation times of the respective switch states in that case can be expressed as follows:

in the case of yp→xp→z→a→xn→yn,
generation time (T0) of the zero vector is T0=0
generation time (T1) of the x vector is T1=T{2−3k sin $\theta$−$3^{1/2}$k cos $\theta$}+T2
generation time (T2) of the z vector is an arbitrary value not larger than T2={2k sin($\theta$+$\pi$/3)−1} and not less than zero
generation time (T3) of the y vector is T3=T{2k sin $\theta$}−T2
generation time (T4) of the a vector is T4=T{$3^{1/2}$k cos $\theta$+k sin $\theta$−1}−T2 in the case of xp→yp→b→z→bn→xn,
generation time (T0) of the zero vector is T0=0
generation time (T1) of the x vector is T1=T{$3^{1/2}$k cos $\theta$−k sin $\theta$}−T2
generation time (T2) of the z vector is an arbitrary value not larger than T2={2k sin($\theta$+$\pi$/3)−1} and not less than zero
generation time (T3) of the y vector is T3=T{2−2·$3^{1/2}$k cos $\theta$}+T2
generation time (T5) of the b vector is T5=T{k sin $\theta$+$3^{1/2}$k cos $\theta$−1}−T2.

Figure 8:
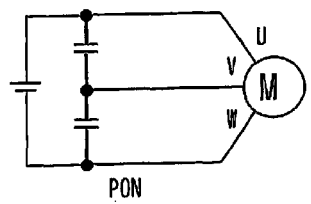
FIG. 8 is an explanatory view showing a connection state to a load in a switch state 2 of the three-phase neutral point clamp type inverter.
Figure 8:
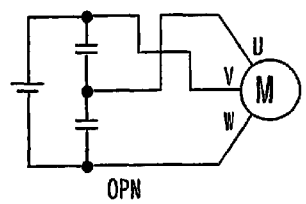
Figure 8:
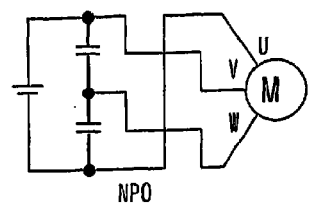
Figure 8:
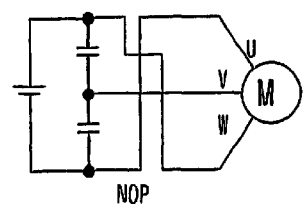
Figure 8:
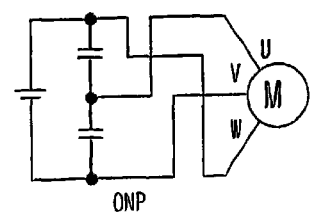
Figure 8:
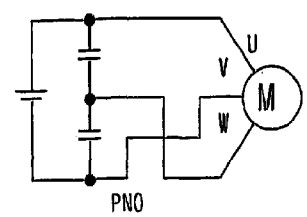
Figure 7:
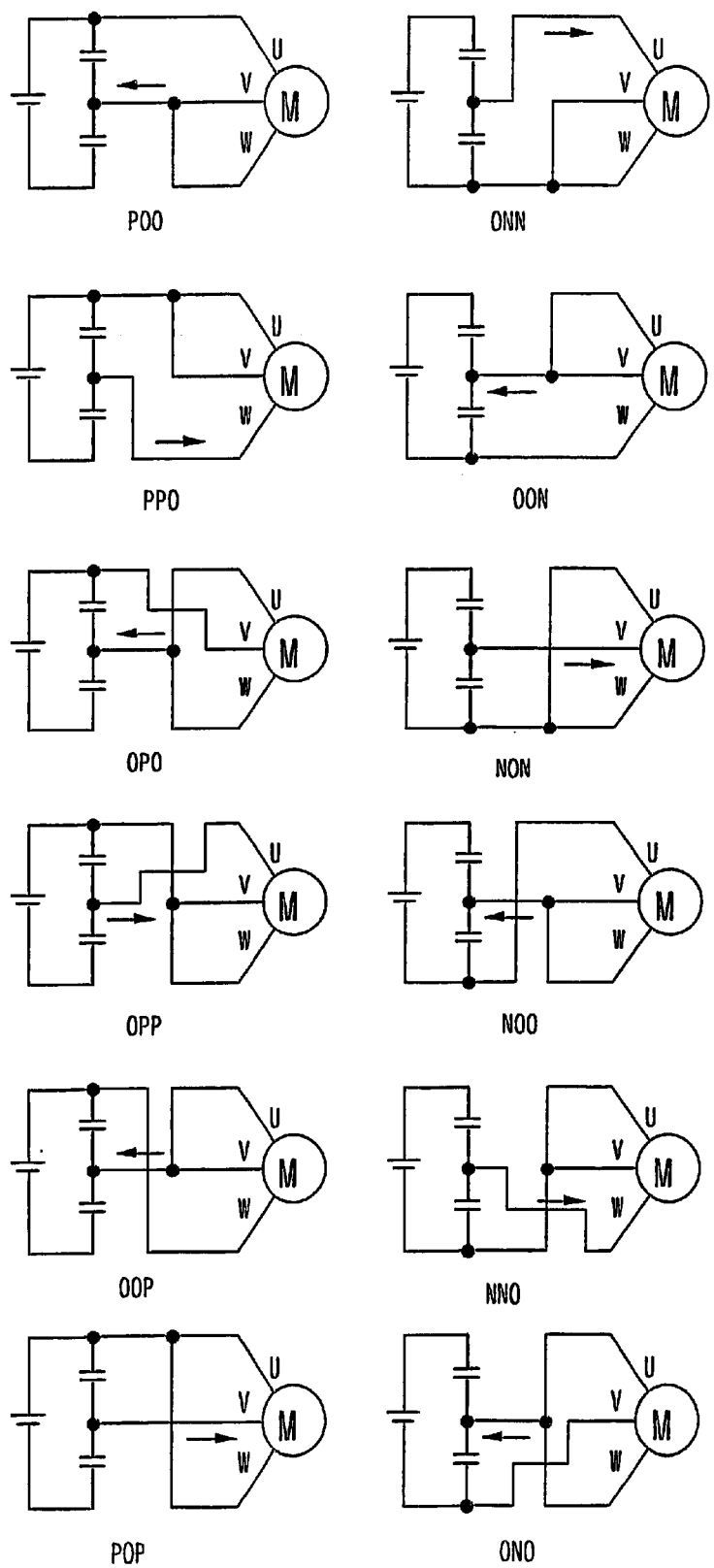
FIG. 7 is an explanatory view showing a connection state to a load in a switch state 1 of the three-phase neutral point clamp type inverter.
Figure 9:
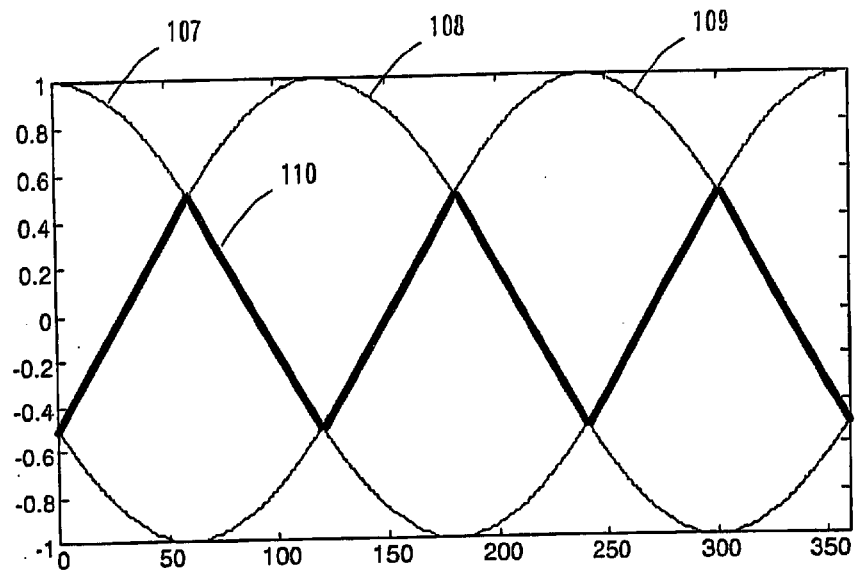
FIG. 9 is a view of a current (load power factor=1) flowing to a neutral line.

When the PWM output pulse trains as described above are adopted, the generation time (T2) of the z vector shown in FIG. 8 can be determined to be an arbitrary value not less than zero, and the fluctuation of the neutral point potential due to the z vector can be suppressed by shortening T2, and in the case where the percent modulation is large (in the case where the generation times of the x and y vectors become short), the generation time of the z vector which changes the neutral point potential can be made short, so that it is possible to suppress the neutral point potential fluctuation fluctuating at a speed three times as fast as the output frequency.

Besides, when the PWM pulse trains of the present invention as described above are adopted, since the switch state of only one phase is changed at the transfer of the PWM pulse, the fluctuation width of the output line-to-line voltage becomes almost equal to the neutral point potential, and a load surge can be suppressed. Incidentally, the above PWM pulse trains are examples, and there is a pulse train other than the above examples, which satisfies the feature of the present invention.

Figure 17:
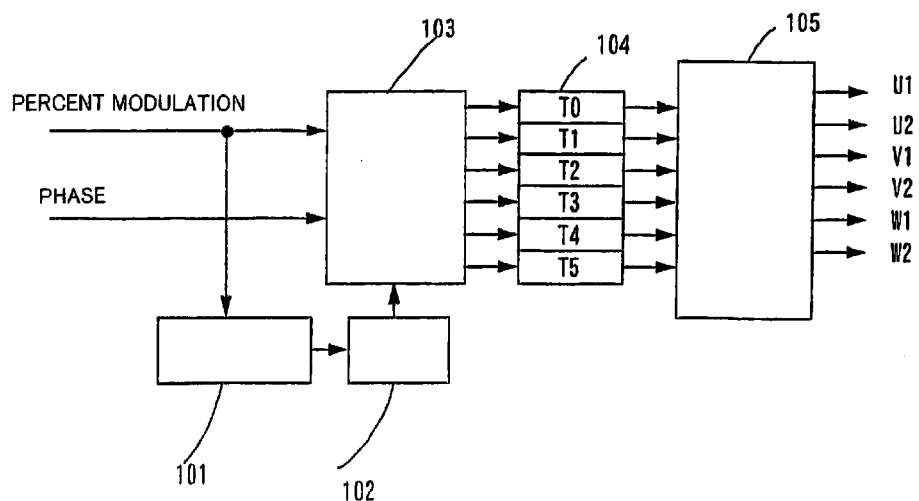

FIG. 17 is a block diagram showing an example of the present invention. In the drawing, reference numeral 101 designates a z vector generation time computing unit 1; 102, a z vector generation time upper limit setting unit; 103, a PWM generation time computing unit; 104, a respective vector generation time setting unit; and 105, a PWM pattern generator.

Since the generation time of the z vector is greatly changed by the percent modulation, in the case where the percent modulation is small and the generation time of the z vector is also small, when the generation time of the z vector is further shortened, the generation time of both the z vector and the a or b vector to be outputted to compensate the z vector become minute, and in the case where the response of a switch element is slow, a correct pulse can not be outputted, and there is a case where the output voltage becomes insufficient. Then, as shown in FIG. 17, the structure is adopted in which the z vector generation time computing unit 1 (101) for changing the set value of T2 in accordance with the percent modulation is added, and the set value of T2 is optimized in accordance with the percent modulation to make an adjust so that the generation of each of the z, a and b vectors does not become too short and the output voltage does not become insufficient.

FIG. 18 is a block diagram showing an example of the present invention. In the drawing, reference numeral 106 designates a z vector generation time computing unit 2.

The fluctuation direction of the neutral point potential when the z vector is generated is determined according to the direction of the load current of the phase connected to the neutral line, and when the current flows to the neutral line, the neutral point potential becomes high, and when the current flows out, the neutral point potential becomes low.

Figure 6:
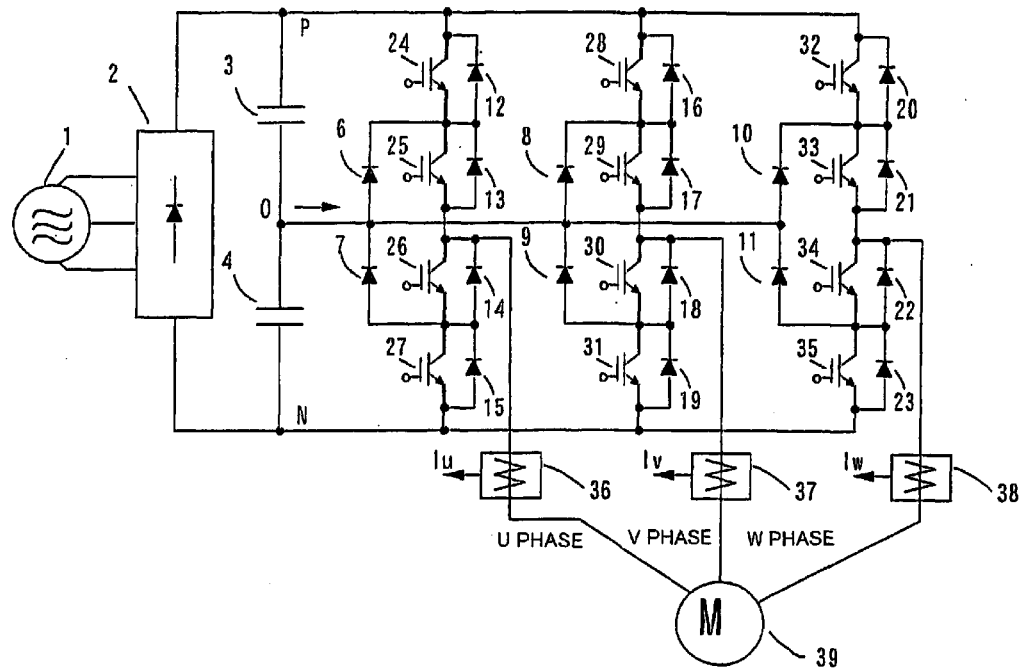
FIG. 6 is a circuit structural view of a three-phase neutral point clamp type inverter.

A circuit of a structure shown in FIG. 18 is used and the percent modulation and phase of a voltage vector and the direction of a phase current of a load connected to the neutral line are measured by the current sensors 36, 37 and 38 shown in FIG. 6, and in accordance with the current direction and neutral point potential control instructions, an operation of time setting of T2 is carried out by the z vector generation time computing unit 2 (106).

In a case where the neutral point potential control instructions are (1) instructions to raise the neutral point potential, when the current flows into the neutral line according to the switch state and the state of the phase current, the generation time ratio of the z vector is made large, and in the other case, the generation time ratio of the z vector is made small, (2) instructions to drop the neutral point potential, when the current is flows out of the neutral line according to the switch state and the state of the phase current, the generation time ratio of the z vector is made large, and in the other case, the generation time ratio of the z vector is made small, or (3) instructions to hold the neutral point potential, the generation time ratio of the z vector is made a constant value.

By doing so, it becomes possible to adjust the neutral point potential to a desired potential. In such an excessive modulation state that the percent modulation exceeds 1, the generation time of the conventionally used x and y vectors capable of adjusting the neutral point potential became almost null, and the adjustment of the neutral point potential was impossible. However, by adjusting the generation time of the z vector by the circuit structure as shown in FIG. 18, the adjustment of the neutral point potential becomes possible even at the excessive modulation time.

As described above, according to the present invention, the neutral point potential fluctuation of the three-phase neutral point clamp type PWM inverter device is suppressed, and further, the adjustment of the neutral point potential at the time of the excessive modulation, which was conventionally impossible, becomes possible, and the improvement of safety and the improvement of output voltage quality can be realized.

Possibility of Industrial Application

The present invention can be applied to an inverter for carrying out variable speed driving of a motor.

What is claimed is:

1. A neutral point potential control method characterized in that when a state in which a phase output terminal of a three-phase neutral point clamp type inverter is connected to a positive bus voltage point of the inverter is P, a state in which it is connected to a neutral point of a bus of the inverter is O, and a state in which it is connected to a negative bus voltage point of the inverter is N, and when an output voltage is expressed as a space vector such that as a three-phase output state of the inverter in order of a U phase, a V phase and a W phase, an output state which becomes POO is a vector xp(1), an output state which becomes ONN is a vector xn(1), an output state which becomes PPO is a vector yp(1), an output state which becomes OON is a vector yn(1), an output state which becomes OPO is a vector xp(2), an output state which becomes NON is a vector xn(2), an output state which becomes OPP is a vector yp(2), an output state which becomes NOO is a vector yn(2), an output state which becomes OOP is a vector xp(3), an output state which becomes NNO is a vector xn(3), an output state which becomes POP is a vector yp(3), and an output state which becomes ONO is a vector yn(3), in the three-phase neutral point clamp type inverter, in a case where an angle of a voltage vector to be outputted by the inverter is contained by the vector yp(3) and the vector yp(1), a generation time ratio of the vector xp(1) to the vector xn(1) is changed according to a direction of a current of the U phase, in a case where the angle of the voltage vector to be outputted by the inverter is contained by the vector yp(1) and the vector yp(2), a generation time ratio of the vector xp(2) to the vector xn(2) is changed according to a direction of a current of the V phase, in a case where the angle of the voltage vector to be outputted by the inverter is contained by the vector yp(2) and the vector yp(3), a generation time ratio of the vector xp(3) to the vector xn(3) is changed according to a direction of a current of the W phase, in a case where the angle of the voltage vector to be outputted by the inverter is contained by the vector xp(1) and the vector xp(2), a generation time ratio of the vector yp(1) to the vector yn(1) is changed according to the direction of the current of the W phase, in a case where the angle of the voltage vector to be outputted by the inverter is contained by the vector xp(2) and the vector xp(3), a generation time ratio of the vector yp(2) to the vector yn(2) is changed according to the direction of the current of the U phase, and in a case where the angle of the voltage vector to be outputted by the inverter is contained by the vector xp(3) and the vector xp(1), a generation time ratio of the vector yp(3) to the vector yn(3) is changed according to the direction of the current of the V phase, whereby a neutral point voltage of the three-phase neutral point clamp type inverter is stabilized.

2. A neutral point potential control method characterized in that when a state in which a phase output terminal of a three-phase neutral point clamp type inverter is connected to a positive bus voltage point of the inverter is P, a state in which it is connected to a neutral point of a bus of the inverter is O, and a state in which it is connected to a negative bus voltage point of the inverter is N, and when an output voltage is expressed as a space vector such that as a three-phase output state of the inverter in order of a U phase, a V phase and a W phase, an output state which becomes POO is a vector xp(1), an output state which becomes ONN is a vector xn(1), an output state which becomes PPO is a vector yp(1), an output state which becomes OON is a vector yn(1), an output state which becomes OPO is a vector xp(2), an output state which becomes NON is a vector xn(2), an output state which becomes OPP is a vector yp(2), an output state which becomes NOO is a vector yn(2), an output state which becomes OOP is a vector xp(3), an output state which becomes NNO is a vector xn(3), an output state which becomes POP is a vector yp(3), and an output state which becomes ONO is a vector yn(3), in the three-phase neutral point clamp type inverter, in a case where an angle of a voltage vector to be outputted by the inverter is contained by the vector yp(3) and the vector yp(1), a generation time ratio of the vector xp(1) to the vector xn(1) is changed according to a direction of a sum of currents of the V phase and the W phase, in a case where the angle of the voltage vector to be outputted by the inverter is contained by the vector yp(1) and the vector yp(2), a generation time ratio of the vector xp(2) to the vector xn(2) is changed according to a direction of a sum of currents of the U phase and the W phase, in a case where the angle of the voltage vector to be outputted by the inverter is contained by the vector yp(2) and the vector yp(3), a generation time ratio of the vector xp(3) and the vector xn(3) is changed according to a direction of a sum of currents of the U phase and the V phase, in a case where the angle of the voltage vector to be outputted by the inverter is contained by the vector xp(1) and the vector xp(2), a generation time ratio of the vector yp(1) to the vector yn(1) is changed according to the direction of the sum of the currents of the U phase and the V phase, in a case where the angle of the voltage vector to be outputted by the inverter is contained by the vector xp(2) and the vector xp(3), a generation time ratio of the vector yp(2) to the vector yn(2) is changed according to the direction of the sum of the currents of the V phase and the W phase, and in a case where the angle of the voltage vector to be outputted by the inverter is contained by the vector xp(3) and the vector xp(1), a generation time ratio of the vector yp(3) to the vector yn(3) is changed according to the direction of the sum of the currents of the U phase and the W phase, whereby a neutral point voltage of the three-phase neutral point clamp type inverter is stabilized.

3. A neutral point potential control method characterized in that when a state in which a phase output terminal of a three-phase neutral point clamp type inverter is connected to a positive bus voltage point of the inverter is P, a state in which it is connected to a neutral point of a bus of the inverter is O, and a state in which it is connected to a negative bus voltage point of the inverter is N, and when an output voltage is expressed as a space vector such that as a three-phase output state of the inverter in order of a U phase, a V phase and a W phase, an output state which becomes POO is a vector xp(1), an output state which becomes ONN is a vector xn(1), an output state which becomes PPO is a vector yp(1), an output state which becomes OON is a vector yp(1), an output state which becomes OPO is a vector xp(2), an output state which becomes NON is a vector xn(2), an output state which becomes OPP is a vector yp(2), an output state which becomes NOO is a vector yp(2), an output state which becomes OOP is a vector xp(3), an output state which becomes NNO is a vector xn(3), an output state which becomes POP is a vector yp(3), and an output state which becomes ONO is a vector yn(3), in the three-phase neutral point clamp type inverter, in a case where an angle of a voltage vector to be outputted by the inverter is contained by the vector yp(3) and the vector yp(1), a current Iu of the U phase is compared with a sum of a current Iv of the V phase and a current Iw of the W phase, and if Iu and Iv+Iw have a same sign and if |Iu|<|Iv+Iw|, then generation of the vector xp(1) is suppressed, if |Iu|>|Iv+Iw|, then generation of the vector xn(1) is suppressed, in a case where the angle of the voltage vector to be outputted by the inverter is contained by the vector yp(1) and the vector yp(2), the current Iv of the V phase is compared with a sum of the current Iu of the U phase and the current Iw of the W phase, and if Iv and Iu+Iw have a same sign and if |Iv|<|Iu+Iw|, then generation of the vector xp(2) is suppressed, if |Iv|>|Iu+Iw|, then generation of the vector xn(2) is suppressed, in a case where the angle of the voltage vector to be outputted by the inverter is contained by the vector yp(2) and the vector yp(3), the current Iw of the W phase is compared with a sum of the current Iu of the U phase and the current Iv of the V phase, and if Iw and Iu+Iv have a same sign and if |Iw|<|Iu+Iv|, then generation of the vector xp(3) is suppressed, if |Iw|>|Iu+Iv|, then generation of the vector xn(3) is suppressed, in a case where the angle of the voltage vector to be outputted by the inverter is contained by the vector xp(1) and the vector xp(2), the current Iw of the W phase is compared with the sum of the current Iu of the U phase and the current Iv of the V phase, and if Iw and Iu+Iv have a same sign and if $|Iw|<|Iu+Iv|$, then generation of the vector yn(1) is suppressed, if $|Iw|>|Iu+Iv|$, then generation of the vector yp(1) is suppressed, in a case where the angle of the voltage vector to be outputted by the inverter is contained by the vector xp(2) and the vector xp(3), the current Iu of the U phase is compared with the sum of the current Iv of the V phase and the current Iw of the W phase, and if Iu and Iv+Iw have a same sign and if $|Iu|<|Iv+Iw|$, then generation of the vector yn(2) is suppressed, if $|Iu|>|Iv+Iw|$, then generation of the vector yp(2) is suppressed, and in a case where the angle of the voltage vector to be outputted by the inverter is contained by the vector xp(3) and the vector xp(1), the current Iv of the V phase is compared with the sum of the current Iu of the U phase and the current Iw of the W phase, and if Iv and Iu+Iw have a same sign and if $|Iv|<|Iu+Iw|$, then generation of the vector yn(3) is suppressed, if $|Iv|>|Iu+Iw|$, then generation of the vector yp(3) is suppressed, whereby a neutral point voltage of the three-phase neutral point clamp type inverter is stabilized.

4. A three-phase neutral point clamp type PWM inverter device comprising neutral point clamp type PWM inverters for three phases, each of which includes a positive bus, a negative bus, and a neutral line, and in each of which a first and a second switch elements and a third and a fourth switch elements are connected in series between the positive bus and a phase voltage output terminal and between the negative bus and the phase output terminal, respectively, and a connection point of the first and the second switch elements and a connection point of the third and the fourth switch elements are connected to the neutral line through clump elements, respectively, and characterized in that a time of a three-phase output voltage of six switch states in which the positive bus, the negative bus, and the neutral line are respectively connected to the three-phase phase output terminals is suppressed to be a first set value or less, and an insufficiency of the output voltage resulting from suppression to the first set value or less is compensated by six switch states among eight switch states in which the three-phase phase output terminals are respectively connected to the positive bus or the negative bus except two switch states in which all of the three-phase phase output terminals are connected to the positive bus or the negative bus at the same time.

5. A three-phase neutral point clamp type PWM inverter device according to claim 4, characterized in that when the six switch states in which the suppression to the first set value or less is carried out are transferred to the six switch states for compensating the insufficiency of the output voltage, the switch state of only one phase of the neutral point clamp type PWM inverter is changed.

6. A three-phase neutral point clamp type PWM inverter device according to claim 4 or 5, characterized in that the first set value is changed according to a value of a percent modulation index.

7. A three-phase neutral point clamp type PWM inverter device according to claim 4 or 5, characterized in that the first set value is changed according to a direction of a current flowing to the neutral line or a phase of an output current.

8. A three-phase neutral point clamp type PWM inverter device according to claim 4 or 5, characterized in that the first set value is changed according to a voltage value of the neutral line.

\* \* \* \* \*